US006111373A

United States Patent [19]

Ohashi

[11] Patent Number: 6,111,373

[45] Date of Patent: Aug. 29, 2000

[54] POWER WINDOW APPARATUS FOR A VEHICLE

[75] Inventor: Nobuaki Ohashi, Tsurugashima, Japan

[73] Assignee: Toyo Denso Kabushiki Kaisha, Tokyo, Japan

[21] Appl. No.: 09/135,836

[22] Filed: Aug. 18, 1998

[30] Foreign Application Priority Data

Aug. 18, 1997 [JP] Japan .................................... 9-257435

[51] Int. Cl.[7] ........................................................ B60J 1/17

[52] U.S. Cl. .......................... 318/265; 318/266; 318/267; 318/446

[58] Field of Search .................................... 318/256, 264, 318/265, 266, 267, 280, 283, 286, 446, 466, 468; 307/9.1, 10.1

[56] References Cited

U.S. PATENT DOCUMENTS 3,611,099 10/1971 Kuroyama ............................... 318/476
3,675,101 7/1972 Robbins ................................. 318/266
5,574,315 11/1996 Weber .................................... 307/10.1

*Primary Examiner*—Bentsu Ro
*Attorney, Agent, or Firm*—Lyon & Lyon LLP

[57] ABSTRACT

A power window apparatus for a vehicle, which can open or close a door window by manual operation of a power window switch for energizing either of window-opening and closing relays for rotating a motor in the forward or reverse direction or by automatic operation of the same switch to cause an auto-latching circuit or a control unit to maintain either of the relays in an energized state until the window becomes fully opened or closed. The apparatus is provided with a switch for deenergizing a coil of the window-closing relay by disconnecting the control circuit for latching the energized window-closing relay, thus enabling the opening of the window by manual switch operation whenever an abnormal operation of the auto-latch control system occurs with simultaneous energization of both the window-opening and closing relays in an accident such as the vehicle sinking into water.

3 Claims, 4 Drawing Sheets

POWER WINDOW APPARATUS FOR A VEHICLE

BACKGROUND OF THE INVENTION

The present invention relates to a power-window apparatus for a vehicle, which apparatus can open and close a door window by a motor-driven mechanism.

A conventional power-window apparatus is operated by using an automatic reset type power-window switch in two steps. The first step (manual mode) operation of the switch in the direction of opening or closing the window energizes a window-opening relay or a window-closing relay through a contact by which a forward (positive) or inverse driving voltage is applied to a motor which rotates in a forward or reverse direction to move the window glass down or up to a desired extent. The second-step (temporary automatic mode) operation of the power-window switch in the window opening or closing direction actuates an auto-latching circuit for maintaining the window-opening or closing relay in an energized state to enable the motor to continue forward or reverse rotation until the window glass moves down or up to the full limit.

The conventional power-window apparatus for a vehicle, however, involves the following important problem.

The power-window apparatus having an auto-latching circuit normally works by energizing either the window-opening relay or the window-closing relay to apply a forward or inverse driving voltage to a driving motor of the power window mechanism depending upon the operation mode of the power window switch. However, in an accident of, e.g., the vehicle sinking into water, a control system of the auto-latching circuit may happen to energize both the relays, whereby the motor cannot rotate and the window cannot be open or shut by manipulating the power window switch.

The problem is serious because a person or persons cannot escape from the vehicle sinking into water if a driver cannot open any door window by the motor by manipulating the power-window switch.

SUMMARY OF THE INVENTION

Accordingly, a primary object of the present invention is to provide a power-window apparatus for a vehicle, which apparatus works by energizing either a window-opening relay or a window-closing relay to apply a forward or inverse driving voltage to a driving motor of the power window mechanism depending upon the operating direction of the power-window switch and by holding the relay in its energized state, and which apparatus is further provided with a switch that, in an accident (e.g., vehicle sinking into water) with the occurrence of abnormal simultaneous energization of both the window-opening and window-closing relays due to the abnormal operation of the auto-latch control system, can actuate in synchronism with manual operation of the power-window switch and break an auto-latch control circuit of the window-closing relay by short-circuiting the relay coil, thus enabling the window to be opened by the motor.

DESCRIPTION OF THE PREFERRED EMBODIMENTS

Figure 1:
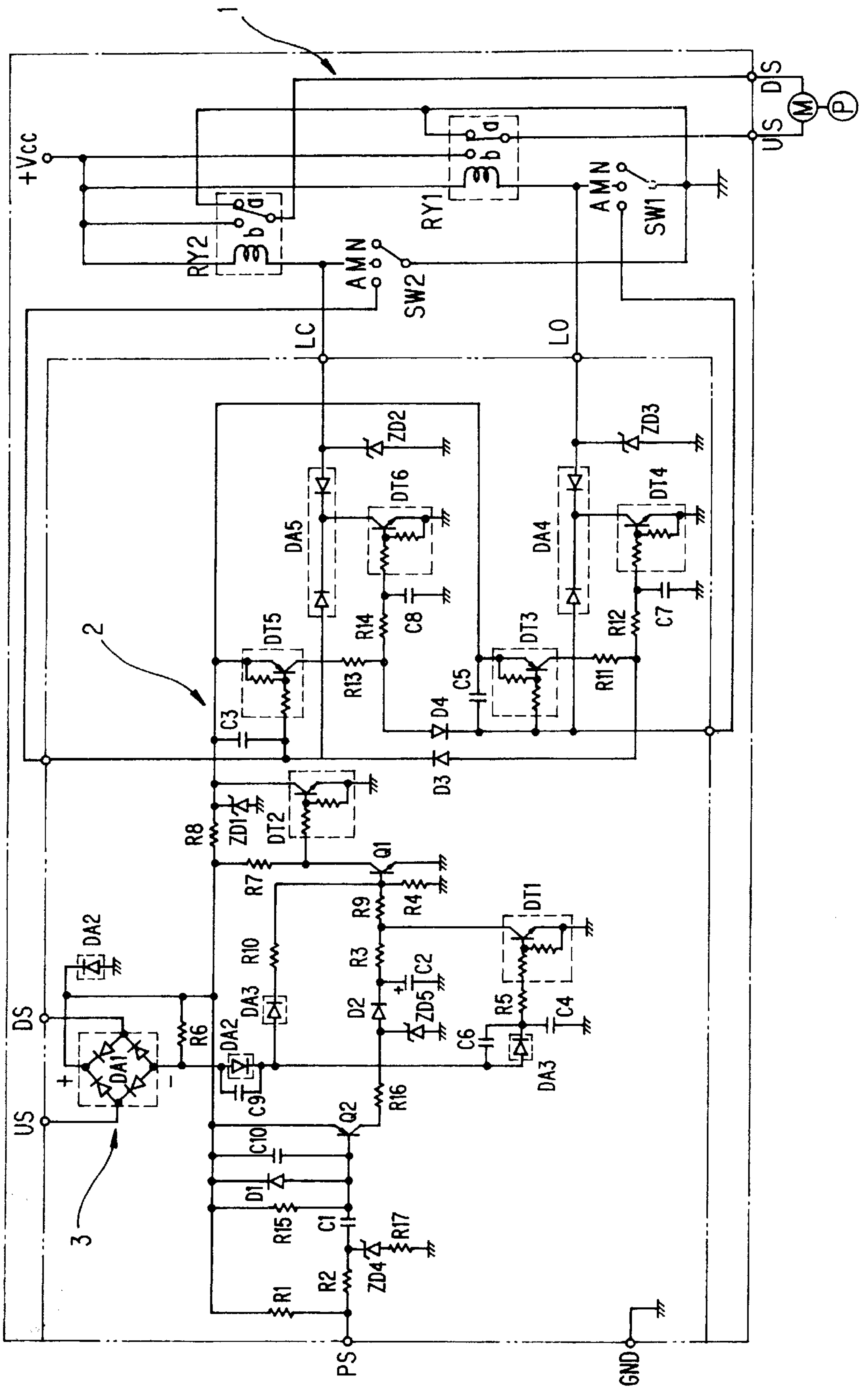
FIG. 1 (PRIOR ART).
FIG. 1 is a circuit diagram showing an exemplified structure of a standard electric circuit system of a conventional power window apparatus.

FIG. 1 is a typical circuit diagram showing circuit arrangements of a conventional power window apparatus. The circuit configuration includes:

a drive control circuit 1 for driving a motor M of the door-window mechanism (not shown) into the forward or reverse rotation to open or close the window during the first-step (manual mode) operation of an automatic reset type compound power-window switch in the direction of opening or closing the window; an auto-latching circuit 2 for continuing the forward or reverse rotation of the DC motor M under the control of the drive control circuit 1 until the window is full opened or closed after the second-step (temporary automatic mode) operation of the power-window switch in the direction of opening or closing the window; and a power supply circuit 3.

The operation of the drive control circuit 1 is as follows:

When the power window switch is operated in the manual mode in the direction of opening the window, a window-opening switch SW1 closes its contact M to energize a window-opening relay RY1, whereby a driving voltage +Vcc is applied in the forward direction to the motor M through a contact (b) of the energized window-opening relay RY1 and a contact (a) of a deenergized window-closing relay RY2. The motor M is driven in forward rotation. When the power switch is operated in the manual mode in the direction of closing the window, a window-closing switch SW2 closes its contact M to energize the window-closing relay RY2 and apply a driving voltage +Vcc in the inverse direction to the motor M through a contact (b) of the energized window-closing relay RY2 and a contact (a) of the deenergized window-opening relay RY1. Thus, the motor M is driven in reverse rotation.

The operation of the auto-latching circuit 2 is as follows:

When the power window-closing switch is operated in the automatic mode in the direction of opening the window, the window-opening switch SW1 closes first its contact M and then temporarily closes its contact A and the power supply circuit 3 provides an output voltage to turn on transistor switches DT3 and DT4 of the auto-latching circuit 2 (with a transistor switch DT2 turned off). At a low level of a window-opening latch line LO the window-opening relay RY1 is energized and the motor M continues its rotation in the forward direction.

In synchronism with rotations of the motor M, the pulser P generates pulse signals PS to be given to the auto-latching circuit 2.

With the pulse signals PS on the auto-latching circuit 2, the transistor switch DT2 is turned off and the switch SW1 is reset to the neutral position N. The transistor switches DT3 and DT4 are held in the ON state, so the window opening relay RY1 is energized and the motor continues its forward rotation.

When the motor M stops with the window fully opened, the pulse PS will not be given to the auto-latching circuit and the transistor switch DT2 is turned on. At the same time, transistor switches DT3 and DT4 are turned off and the window-opening latch line LO attains a high level to deenergize the window-opening relay RY1 and remove the voltage +Vcc from the motor M.

When the power-window switch is operated in the automatic mode in the direction of closing the window, the window-opening switch SW2 closes its contact M first and then temporarily closes its contact A, whereby the power supply circuit 3 provides an output voltage to turn on transistor switches DT5 and DT6 of the auto-latching circuit 2 (with a transistor switch DT2 turned off). At a low level of a window-opening latch line LC, the window-closing relay RY2 is energized and the motor M is driven into reverse rotation. Again, the pulser P generates pulse signals PS in synchronism with the motor M, which signals are transmitted to the auto-latch circuit 2.

With the pulse signal PS on the auto-latching circuit 2, the transistor switch DT2 remains turned off and the switch SW1 is reset to the neutral position N. The transistor switches DT5 and DT6 are held in the ON state, whereby the window closing relay RY2 is energized to keep the motor rotating in the reverse direction.

When the motor M stops with the window fully closed, the pulse PS will not be given to the auto-latching circuit 2 and the transistor switch DT2 is turned on. At the same time, transistor switches DT5 and DT6 are turned off and the window-closing latch line LC attains a high level to deenergize the window-closing relay RY2 and remove the voltage +Vcc from the motor M.

In the event of the vehicle having an accident of, e.g., sinking into water, the above power window apparatus may have the auto-latching circuit 2 short-circuited to drop levels of both the window-opening and window-closing latch lines LO and LC, so both the window-opening and window-closing relays RY1 and RY2 are energized at the same time, making it impossible to drive the motor M by the power window switch.

Figure 2:
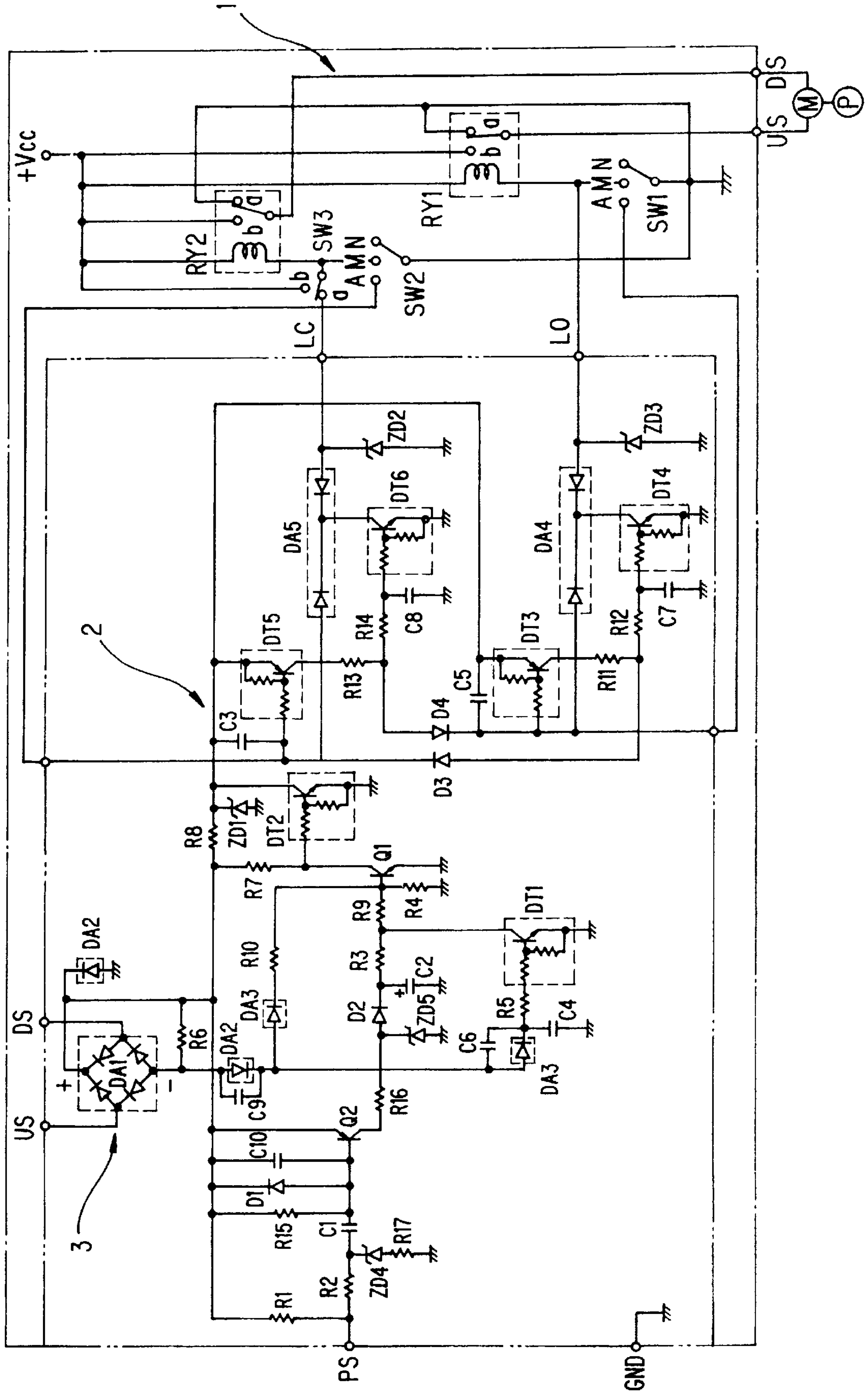
FIG. 2 is a circuit diagram showing an exemplified structure of an electric circuit system of a power window apparatus according to an aspect of the present invention.

Accordingly, the present invention provides the power window apparatus with a switch SW3 shown in FIG. 2, which switch actuates simultaneously with the manual operation of the power-window switch in the direction of opening the window to engage contact (b) and forcibly cuts off the window-closing latch line LC in the auto-latching circuit 2 to make the window-closing relay RY2 short-circuited.

The power window apparatus provided with the above-described switch is capable of opening a vehicle door-window by manipulating the power window switch in the window-opening direction even if auto-latching circuit 2 is short-circuited and both the window-opening and window-closing relays RY1 and RY2 are simultaneously energized in an accident of a vehicle sinking into water. This is realized by the switch SW3 that actuates simultaneously with the manual operation of the power-window switch SW1 and cuts off the window-closing latch line LC being at an abnormally low level to deenergize the window-closing relay RY2. Consequently, only window-opening relay RY1 is held in the energized state and the motor M is driven into forward rotation for opening the door window.

Figure 3:
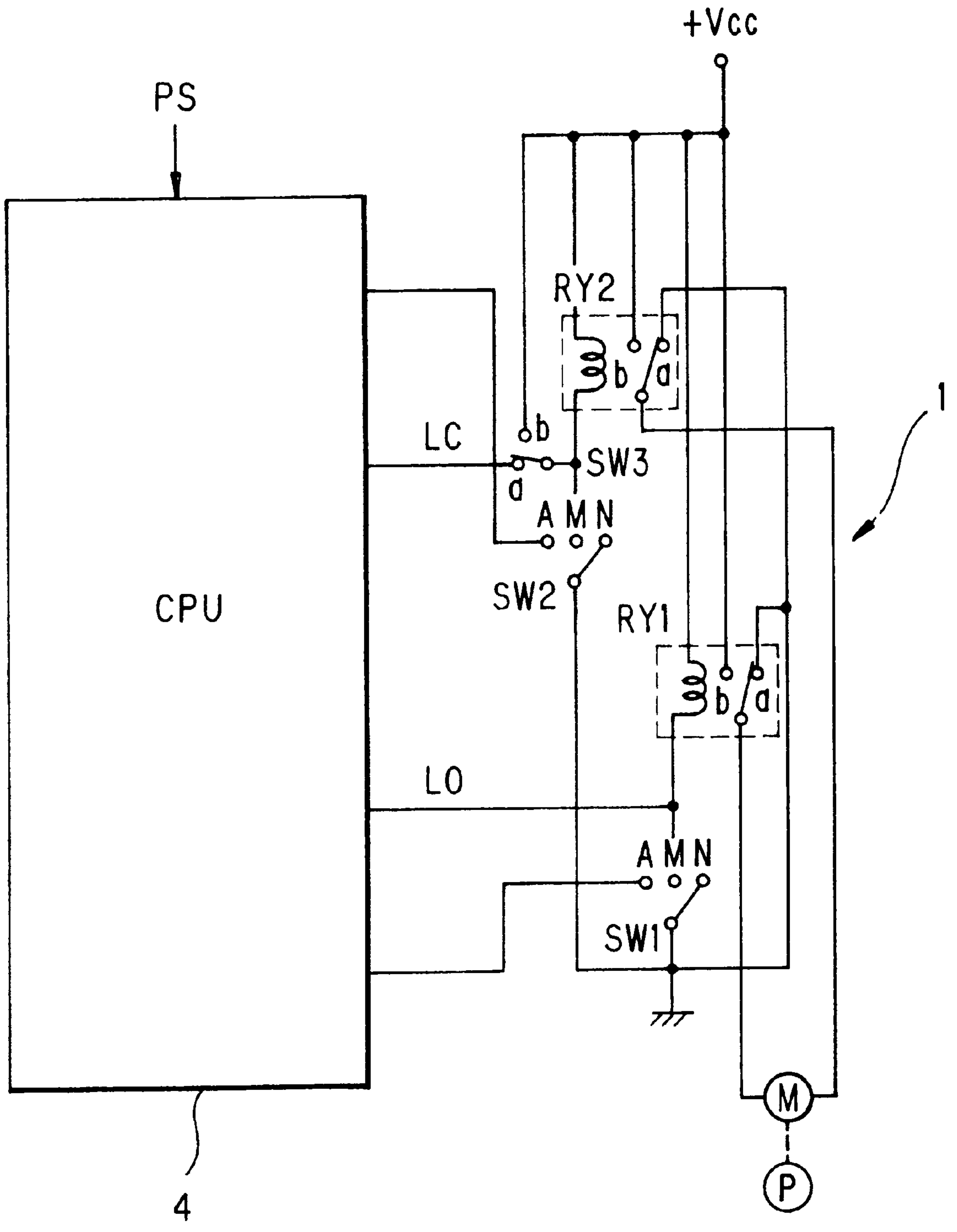
FIG. 3 is a circuit diagram showing an exemplified structure of an electric circuit system of a power window apparatus according to another aspect of the present invention.

FIG. 3 illustrates another embodiment of the present invention.

In this embodiment, a control unit 4 that is a central processing unit (CPU) for executing centralized control of vehicle door-related operations (e.g., for opening and closing respective door windows, switching ON and OFF door locks, turning ON and OFF door lamps and adjusting a power-driven mirror) can also perform the auto-latching function of the power-window and is further provided with a switch SW3 that can actuate simultaneously with the manual operation of a power window switch to engage contact (b) and makes a window-closing relay coil RY2 short-circuited by disconnecting a control circuit for energizing the window-closing relay in the control unit (CPU) 4.

Figure 4:
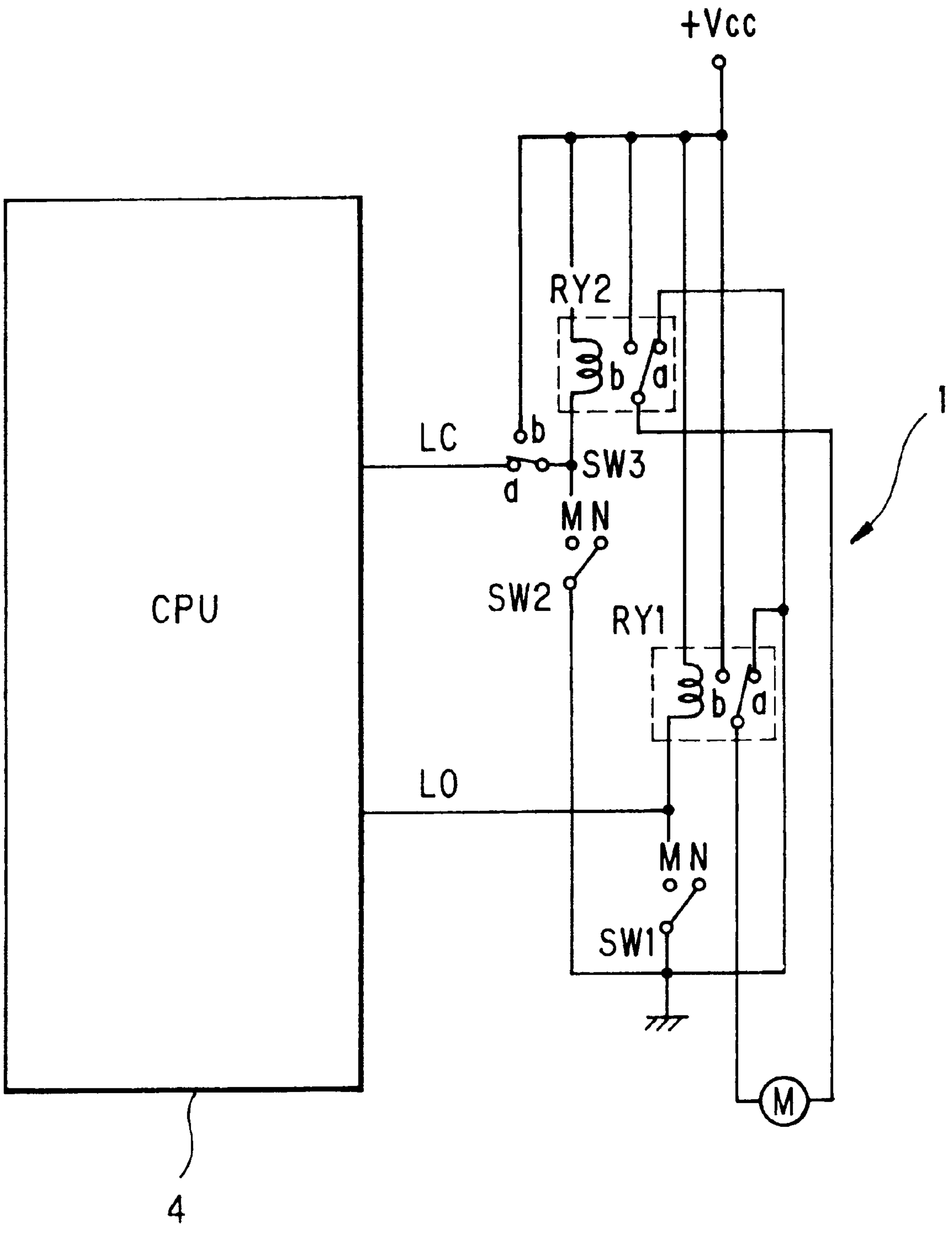
FIG. 4 is a circuit diagram showing an exemplified structure of an electric circuit system of a power window apparatus according to a further aspect of the present invention.

FIG. 4 illustrates a further embodiment of the present invention.

This embodiment is applied in particular to a power-window apparatus intended to operate a window-opening switch SW1 and a window-closing switch SW2 in a manual mode only and has no auto-latching function. Namely, the power-window apparatus according to the embodiment can open and close a window of a vehicle during the manual operation of the window-opening switch SW1 and the window-closing switch SW2, respectively, and also by energizing a window-opening relay RY1 and a window-closing relay RY2, respectively, under the control of a control unit (CPU) 4 for executing concentrated control of vehicle door-related functions (e.g., opening/closing respective door-windows, switching ON and OFF door locks, turning ON and OFF door lamps and adjusting a power-driven mirror) and is further provided with a switch SW3 that can actuate simultaneously with the manual operation of a power window switch in the window-opening direction to engage contact (b) and short-circuit the window-closing relay coil by disconnecting a control line LC for energizing the window-closing relay RY2 in the control unit (CPU) 4.

In practice, a plurality of the power-window apparatuses may be provided, one for each of the door-windows (e.g., an assistant-seat-side door-window and the back-seat-side door-windows) of the vehicle, and all the power-window switches are arranged on an operation panel in front of the driver's seat. When the driver manually operates any power-window switch, a command signal is produced and sent to the control unit (CPU) 4 which in turn executes the control operation for opening or closing a designated window.

Similarly to the embodiment described with reference to FIG. 2, both the embodiments of FIGS. 3 and 4 are capable of opening a door-window by manually operating the power-window switch in the window opening direction even if the control unit (CPU) 4 is short-circuited causing simultaneous actuation of window-opening and closing relays RY1 and RY2 in a motor-drive control circuit 1 in an accident of, e.g., the vehicle sinking into water. This is realized by the effect of the switch SW3 that in the same case actuates with the manual operation of the power-window switch in the window-opening direction and disconnects the window-closing holding line LC from being at an abnormal low-level in the control unit (CPU) 4 and deenergizes the window-closing relay RY2 to drive the motor M in the forward direction.

As described above, the power-window apparatus according to an aspect of the present invention is capable of opening or closing a door window of a vehicle by manual operation of a power-window switch energizing either of the relays for rotating a motor in a forward or reverse direction and by automatic operation of the power window switch to cause an auto-latching circuit or a control unit (CPU) to energize and maintain either of the relays in theenergized state until the door window becomes fully opened or closed, and is further provided with a switch that can actuate simultaneously with the manual operation of the power-window switch in the window-opening direction and deenergizes a coil of the window-closing relay by disconnecting the control circuit for latching the energized window-closing relay. The provision of the switch can effectively eliminate the abnormal simultaneous actuation of both the window-opening and window-closing relays due to the abnormal operation of auto-latching control system in an accident (e.g., when the vehicle is sinking into water), thus enabling the motor to open the window. This switch can be added to an existing electric circuit system of the power-window apparatus without providing any special control circuit.

The power-window apparatus according to another aspect of the present invention is capable of opening or closing a door window of a vehicle by manual operation of a power-window switch energizing either of the relays for rotating a motor in a forward or reverse direction and by automatic operation of the power window switch to cause a control unit (CPU) to maintain either of the relays in energized state for the forward or reverse rotation of the motor, and is further provided with a switch that can actuate simultaneously with the manual operation of the power-window switch in the window-opening direction and deenergizes a coil of the window-closing relay by breaking the control circuit for latching the energized window-closing relay. The abnormal simultaneous actuation of both the window-opening and window-closing relays due to the abnormal operation of the auto-latching control system in an accident (e.g., when the vehicle is sinking into water) can be effectively eliminated by the effect of the switch that can be added to an existing electric circuit system of the power-window apparatus without providing any special control circuit, thus enabling opening the window.

What is claimed is:

1. A power window apparatus being capable of opening or closing a window by manual operation of a power-window switch in a window-opening or closing direction, said operation energizing a window-opening relay or a window-closing relay to drive a motor of a power-window mechanism into forward or reverse rotation for opening or closing the window during the manual operation and by temporary automatic operation of the power-window switch in the window-opening or closing direction, said automatic operation causing an auto-latching circuit to be turned-on for holding the window-opening relay or the window-closing relay in the energized state to maintain the forward or reverse rotation of the motor until the window becomes fully opened or closed, wherein the apparatus is further provided with a switch that is actuated conjointly with the manual operation of the power-window switch in the window-opening direction and disconnects a control circuit for latching the window-closing relay energized in the auto-latching circuit to make a coil of the window-closing relay short-circuited.

2. A power window apparatus being capable of opening or closing a window by manual operation of a power-window switch in a window-opening or closing direction, said operation energizing a window-opening relay or a window-closing relay to drive a motor of a power-window mechanism into forward or reverse rotation for opening or closing the window during the manual operation and by temporary automatic operation of the power-window switch in the window-opening or closing direction, said automatic operation causing a control unit to hold the window-opening relay or the window-closing relay in the energized state for maintaining the forward or reverse rotation of the motor until the window becomes fully opened or closed, wherein the apparatus is further provided with a switch that is actuated conjointly with the manual operation of the power-window switch in the window-opening direction to disconnect a control circuit for latching the window-closing relay energized in the control unit to make a coil of the window-closing relay short-circuited.

3. A power window apparatus being capable of opening or closing a window by manual operation of a power-window switch in a window-opening or closing direction, said operation energizing a window-opening relay or a window-closing relay to drive a motor of a power-window mechanism into forward or reverse rotation for opening or closing the window during the manual operation and by temporary automatic operation of the power-window switch in the window-opening or closing direction, said automatic operation causing a control unit to hold the window-opening relay or the window-closing relay in the energized state to maintain the forward or reverse rotation of the motor, wherein the apparatus is further provided with a switch that is actuated conjointly with the manual operation of the power-window switch in the window-opening direction and disconnects a control circuit for latching the window-closing relay from a coil of the window-closing relay to short-circuit the window-closing relay.

* * * * *